United States Patent
Kim

(10) Patent No.: US 9,191,697 B2
(45) Date of Patent: Nov. 17, 2015

(54) DEVICE AND METHOD FOR PROVIDING PSI OF DIGITAL BROADCASTING PROGRAM TO WATCHER

(75) Inventor: Jin Pil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2534 days.

(21) Appl. No.: 10/286,797

(22) Filed: Nov. 4, 2002

(65) Prior Publication Data

US 2003/0101448 A1    May 29, 2003

(30) Foreign Application Priority Data

Nov. 3, 2001 (KR) .......................... 10-2001-68357

(51) Int. Cl.

| | |
|---|---|
| H04N 21/434 | (2011.01) |
| H04N 21/235 | (2011.01) |
| H04N 21/2668 | (2011.01) |
| H04N 21/435 | (2011.01) |
| H04N 21/458 | (2011.01) |
| H04N 21/482 | (2011.01) |
| H04N 5/60 | (2006.01) |
| H04N 21/478 | (2011.01) |
| H04N 21/488 | (2011.01) |

(52) U.S. Cl.
CPC ......... *H04N 21/4345* (2013.01); *H04N 21/235* (2013.01); *H04N 21/2668* (2013.01); *H04N 21/434* (2013.01); *H04N 21/435* (2013.01); *H04N 21/4586* (2013.01); *H04N 21/482* (2013.01); *H04N 5/602* (2013.01); *H04N 21/478* (2013.01); *H04N 21/4884* (2013.01)

(58) Field of Classification Search
USPC .......................... 725/45, 46, 47, 135, 142, 151
See application file for complete search history.

(56) References Cited

U.S. PATENT DOCUMENTS

| | | | |
|---|---|---|---|
| 5,844,478 A * | 12/1998 | Blatter et al. ................. | 348/474 |
| 6,104,436 A | 8/2000 | Lee | |
| 6,209,131 B1 * | 3/2001 | Kim et al. ...................... | 725/50 |
| 7,051,360 B1 * | 5/2006 | Ellis et al. ..................... | 725/136 |
| 7,086,076 B1 * | 8/2006 | Park ................................ | 725/50 |
| 7,113,523 B1 * | 9/2006 | Kubota et al. ................. | 370/535 |
| 7,174,512 B2 * | 2/2007 | Martin et al. ................. | 715/719 |
| 2002/0062487 A1 * | 5/2002 | Ohno et al. .................... | 725/133 |
| 2006/0117370 A1 * | 6/2006 | Kitazato et al. ............... | 725/116 |

FOREIGN PATENT DOCUMENTS

| | | |
|---|---|---|
| JP | 2001-57542 | 2/2001 |
| KR | 10-1999-60513 | 7/1999 |

OTHER PUBLICATIONS

Advanced Television System Committee☐☐Program and System Information Protocol for Terrestrial Broadcast and Cable☐☐Dec. 23, 1997☐☐Advanced Television System Committee☐☐Doc. A/65☐☐pp. 27-39, 77-81.*

(Continued)

*Primary Examiner* — Jun Fei Zhong
(74) *Attorney, Agent, or Firm* — Dentons US LLP

(57) ABSTRACT

Device and method for real time monitoring, and providing of useful program specific information (PSI) of a program received from a digital TV broadcasting system to a watcher, wherein, when broadcasting program PSI is changed, the change of the PSI is detected by monitoring a PMT in a PSIP, and facts of the change or addition of additional functions for a program following the change or addition of the PSI of the digital broadcasting program is reflected and informed to a watcher.

5 Claims, 4 Drawing Sheets

(56) References Cited

OTHER PUBLICATIONS

ISO/IEC☐☐Information technology —Generic coding of moving pictures and associated audio information: Systems☐☐Dec. 1, 2000☐☐ISO/IEC☐☐ISO/IEC13818-1, second edition☐☐section 2.4.4.*

ISO/IEC Information technology—Generic coding of moving pictures and associated audio information: Systems Dec. 1, 2000, ISO/IEC13818-1.*

Office Action issued by the Canadian Patent Office on Mar. 23, 2005 in corresponding Canadian Application No. 2,410,801.

The Office Action issued by the Canadian Patent Office on Jul. 9, 2007 in corresponding Canadian Application No. 2,410,801.

Office Action for counterpart Korean patent application No. 10-2001-0068357 dated Sep. 23, 2003.

Office Action for counterpart Canadian patent application No. 2,410,801 dated Aug. 27, 2008.

* cited by examiner

FIG. 1

| syntax | bit | format |
|---|---|---|
| TS_program_map_section() { | | |
|     table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for(i=0;i<N;i++) { | | |
|     descriptor() | | |
|   } | | |
|   for (i=0;i<N1;i++){ | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for(i=0; i<N1;i++){ | | |
|     descriptor() | | |
|     } | | |
|   } | | |
|   CRC_32 | 32 | |
| } | | |

FIG. 2

16 List of Descriptors for PSIP Tables

| Descriptor Name | Descriptor tag | Terrestrial | | | | Cable | | | |
|---|---|---|---|---|---|---|---|---|---|
| | | PMT | MGT | VCT | EIT | PMT | MGT | VCT | EIT |
| Stuffing descriptor | 0x80 | * | * | * | * | * | * | * | * |
| AC-3 audio descriptor | 0x81 | M | | | M | M | | | O |
| Caption service descriptor | 0x86 | M | | | M | M | | | O |
| Content advisory Descriptor | 0x87 | M | | | M | | | | O |
| Extended channel name descriptor | 0xA0 | | | M | | | | M | |
| Service location descriptor | 0xA1 | | | S | | | | | |
| Time-shifted service descriptor | 0xA2 | | | M | | | | M | |
| Component name descriptor | 0xA3 | M | | | | M | | | |

DEVICE AND METHOD FOR PROVIDING PSI OF DIGITAL BROADCASTING PROGRAM TO WATCHER

This application claims the benefit of the Korean Application No. P2001-68357 filed on Nov. 3, 2001, which is hereby incorporated by reference.

BACKGROUND OF THE INVENTION

1. Field of the Invention

The present invention relates to a digital TV system, and more particularly, to device and method for real time monitoring, and providing of useful program specific information (PSI) of a program received from a digital TV broadcasting system to a watcher.

2. Background of the Related Art

In general, the digital TV system can transmit a broadcasting signal for broadcasting a program expressed as an audio and a video, and, along with this, the PSI. The PSI provides watchers guide information on the program, for providing various services to the watcher conveniently.

The PSI is provided by using a PSIP (Program and System Information Protocol) which has a plurality of tables containing the PSI. The tables in the PSIP are a PMT (Program Map Table) containing program list information, an EIT (Event Information Table) containing various PSI on the programs, a VCT (Virtual Channel Table) containing channel information on the programs, an MGT (Master Guide Table) for checking updating and version of the tables in the PSIP.

Particularly, PSI services for providing services of parental rating and digital caption, e.g., DTV closed caption, or additional functions of the program, such as multiple audio service, can be known by a descriptor contained in the EIT and VCT. For an example, the parental rating can be known from a rating on a content advisory descriptor in the EIT. The digital caption service can be known by a value on the caption service descriptor in the EIT. The multiple audio services can be known by a value on a service location descriptor in the VCT.

In general, the PSI in the broadcasting programs has version changes as the occasion demands. When the PSI in the broadcasting programs has the version change in a related art, the descriptors of the EIT and VCT are parsed, for detecting the PSI change.

Moreover, in the related art, if a change an additional function of a particular program is required by the PSI service, the additional function change of the program is made without giving a prior notice to the user (watcher).

Furthermore, even if there is a change, or addition of the additional function of a particular program by the PSI service, there has been no suggestion for reflecting the fact of a change, or addition of the additional function to the program, and giving notice in advance, yet. Consequently, since the user can not know the additional functions the program supports presently in advance, there has been inconvenience of verifying the additional function the program supports presently one by one.

For an example, it is assumed that a program which supports additional functions shown on a table 1 below is broadcasted.

TABLE 1

| Program | Parental rating | Digital caption | Multiple audio |
|---|---|---|---|
| Drama | Over 19 years old | No | Korean, English |
| Movie | Over 15 years ode | English caption | English 1, English 2, Korean |

It is assumed that the watcher 'A' sets a watch environment of a DTV set, such that the parental rating service is canceled (i.e., the parental rating function is turned off), "English caption" is set as the DTV caption service, and English is set as a language of the multiple audio service (a function for selecting a main voice language, and a supplementary voice language), and watches a drama as the present broadcasting program.

Then, since the drama is the program that no digital caption is supported, the watcher 'A' watches the drama in an English voice from the multiple audio service.

Then, a movie starts after the drama, when the watcher 'A' watches the movie reading English caption and hearing, not the English voice the watcher set, but the "English-1" set as default in the movie.

Consequently, the watcher 'A' can not but watch the movie without knowing in advance that if the present movie is a program having a parental rating, what languages the digital caption can support, and what languages are available from the multiple audio service.

SUMMARY OF THE INVENTION

Accordingly, the present invention is directed to device and method for providing PSI of a digital broadcasting program to a watcher that substantially obviates one or more of the problems due to limitations and disadvantages of the related art.

An object of the present invention is to provide device and method for providing PSI of a digital broadcasting program to a watcher, which can detect a change of PSI.

Another object of the present invention is to provide device and method for providing PSI of a digital broadcasting program to a watcher, which can reflect a change, or addition of an additional function of programs coming from change or addition of PSI in a digital broadcasting program to the programs, and informing to the watcher in advance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for providing PSI (Program Specific Information) of a digital broadcasting program to a watcher, includes a first step for making real time monitoring of a fact of change of additional functions included to a transport stream of a broadcasting program, and receiving a description of the change, parsing the description of the change of the received additional function, and displaying the description of the change of the parsed additional functions on a display.

More preferably, the method for providing PSI (Program Specific Information) of a digital broadcasting program to a watcher further includes the step of storing the received description of the change of the additional function, and the step of displaying the stored description of the change of the additional function on a display at a time a pertinent program is started. When the user selects a broadcasting service which supports a particular additional function from the description of change of the additional services displayed on the display, a pertinent program is broadcasted according to the selected additional function.

More preferably, the first step includes the step of real time monitoring facts of changes of parental rating and/or digital caption service and/or multiple audio service included in the transport stream of the broadcasting program, and receiving the description of changes.

More preferably, the first step includes the steps of storing a packet identifier PID, a table ID table_id, a program number program_number, and a version number in a PMT (Program Map Table) in the transport stream received at the present time when the program is broadcasted in an initial additional function at the present time, and setting a register value at a reception terminal by using the packet identifier PID for receiving a new version of the PMT having a version number greater than a stored version number.

In another aspect of the present invention, there is provided a method for providing PSI of a digital broadcasting program to a watcher, including parsing a program broadcasting transport stream into a PAT (Program Association Table), and a PMT (Program Map Table) which are based on a PSIP (Program and System Information Protocol), and storing the PAT and the PMT, a second step for parsing a new version of the PMT following change of additional functions of the program, and replacing the stored PMT with the new version of PMT, and displaying a description of change of the additional functions of the broadcasting program based on the new version of PMT stored newly on the display.

In further aspect of the present invention, there is provided a device for providing PSI of a digital broadcasting program including a transport decoder for receiving a new version of PMT following a change of additional functions of a broadcasting program, a PSIP/PSI decoder for parsing the new version of PMT, and forwarding a signal for displaying a description of the change of the additional functions, and a user interface block for receiving the signal and displaying the description of change of the additional functions.

More preferably, the device for providing PSI of a digital broadcasting program further includes a PSI database for storing the parsed new version of PMT updating the PMT.

The PSIP/PSI decoder filters a packet identifier PID, a table ID table_id, a program number, and a version number from a PMT in a transport stream received at the present time, and sets the packet identifier PID of the transport decoder.

The user interface block displays the description of change of the additional functions on a display at a time a pertinent broadcasting program starts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a diagram showing a syntax of a program map section for a PMT in a digital broadcasting transport stream;

FIG. 2 illustrates a descriptor list of PSIP tables based on ATSC (Advanced Television System Committee);

DETAILED DESCRIPTION OF THE PREFERRED EMBODIMENT

Figure 3:
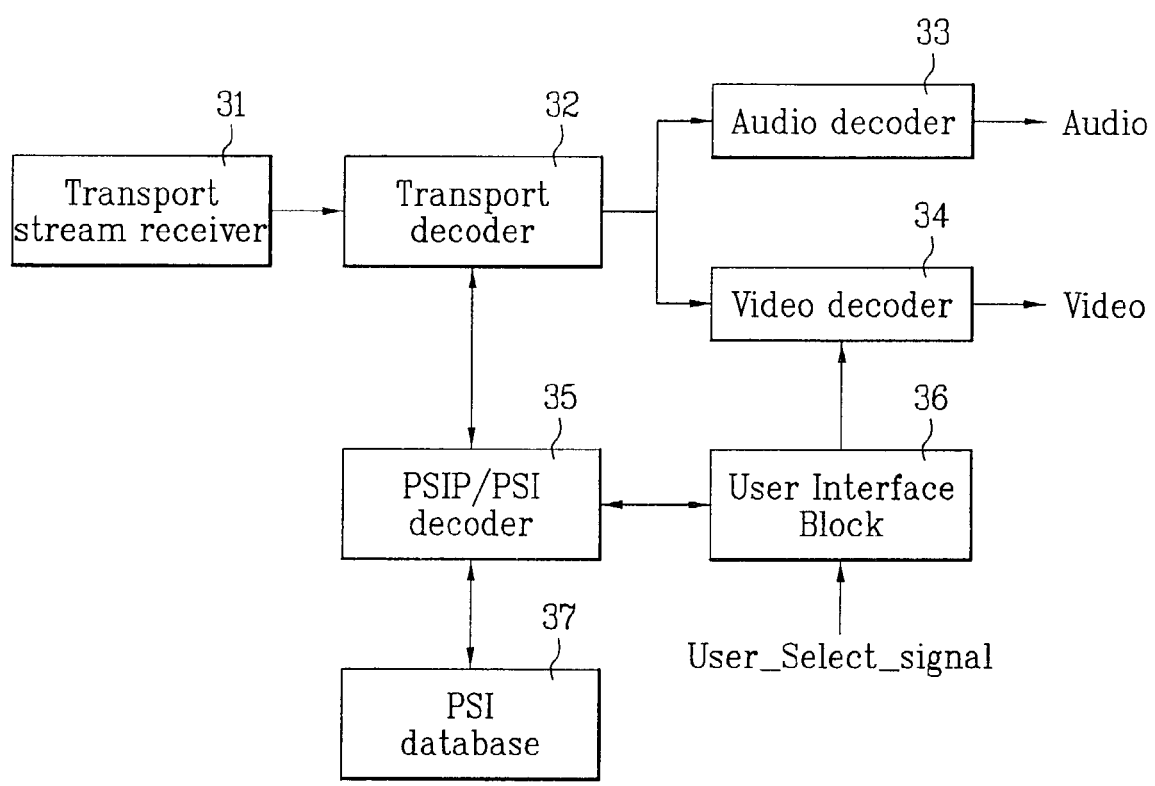
FIG. 3 illustrates a block diagram of a device for providing PSI of a digital broadcasting program to a watcher in accordance with a preferred embodiment of the present invention.

Reference will now be made in detail to the preferred embodiments of the present invention, examples of which are illustrated in the accompanying drawings.

FIG. 1 illustrates a diagram showing a syntax of a program map section for a PMT in a digital broadcasting transport stream. In more detail, FIG. 1 illustrates a section syntax for a PMT described in ISO/IEC 13818-1 among documents transmission rules for digital television are specified therein. FIG. 2 illustrates a descriptor list of PSIP tables based on ATSC (Advanced Television System Committee).

One digital broadcasting program is matched to one virtual channel. Therefore, the syntax for a PMT in FIG. 1 illustrates a specification of a virtual channel for one digital broadcasting program.

The second "for" loop in the syntax for a PMT in FIG. 1 defines elementary streams (ES) on the virtual channel (i.e., a transport stream for one program). A structure of the elementary stream will be shown with reference to the table 1.

If a drama is broadcasted at the present time, the second "for" loop in the syntax for a PMT in FIG. 1 has one video elementary stream ESx1, and two audio elementary streams audio ESx2 defined therein. The audio elementary streams are an audio ES by Korean, and an audio ES by English.

Definition on a content advisory descriptor is declared for representing a parental rating in a descriptor loop, which is for declaring definitions of descriptors in FIG. 1.

If the drama ends, and the present broadcasting program is changed to a movie, the second "for" loop in the syntax for a PMT in FIG. 1 has one video elementary stream video ESx1, and three audio elementary stream audio ESx3 defined therein. The audio streams are audio elementary streams for Korean, English-1, and English-2.

Then, a value of a component name descriptor component_name_descriptor declared in the descriptor loop for describing different languages on the audio elementary streams audio ES is changed.

Moreover, for displaying an English caption function started to be supported as the program changes from a drama broadcasting program to a movie broadcasting program, a caption service descriptor caption_service_descriptor to the descriptor loop, for describing digital caption information.

Furthermore, since the parental rating changes from 19 or over 19 to 15 or over 15 as the program changes from the drama broadcasting program to the movie broadcasting program, the value of the content advisory descriptor declared to the descriptor loop before is changed.

As described, as the drama broadcasting program ends, and the movie broadcasting program starts, the syntaxes for the PMT change, and, according to the change, a value of a version number version_number becomes greater.

In other words, when the program changes from the drama broadcasting program to the movie broadcasting program, the present invention sets such that the PMT is received newly at a transport decoder chip by changing a version number value of a PMT. Once the new version PMT is received, the new PMT is parsed, and parsed description is provided to a user interface block. According to this, a description of change is displayed on a banner window which displays the additional functions, for informing change of the additional functions of the broadcasting program.

Thus, in the present invention, a reception terminal of DTV monitors the version number of a PMT, and a new PMT received thus is parsed, and changes of additional functions of the programs are informed.

FIG. 3 illustrates a block diagram of a device for providing PSI of a digital broadcasting program to a watcher in accordance with a preferred embodiment of the present invention, for monitoring a version number of a PMT, parsing a newly received PMT, and displaying a change of description of the additional functions.

Referring to FIG. 3, the device in accordance with a preferred embodiment of the present invention includes a transport stream receiver 31, a transport decoder 32, an audio decoder 33, a video decoder 34, a PSIP/PSI decoder 35, a user interface block 36, and a PSI database 37.

The transport stream receiver 31 receives a broadcasting signal (an audio stream and a video stream) for broadcasting a program, and a transport stream including PSI.

The transport decoder 32 provides a packet identifier PID, a table ID table_id, a program number program_number, a version number version_number from a PMT in a transport stream to the PSIP/PSI decoder 35 for filtering, sets a packet identifier PID for the broadcasting program selected by a user, and provides an audio stream and a video stream for the selected broadcasting program.

The transport decoder 32 receives a new version of PMT when a broadcasting program or additional functions of the broadcasting program in the transport stream received at the transport stream receiver 31 is changed.

The audio decoder 33 receives the audio stream from the transport decoder 32, decodes, and provides to a voice forwarding device, such as a speaker.

The video decoder 34 receives the video stream from the transport decoder 32, decodes, and provides to a display (TV screen).

The PSIP/PSI decoder 35 parses the new version of PMT from the transport decoder 32, and provides a changed description of the broadcasting program, or the additional functions of the programs.

The user interface block 36 provides the changed description of the broadcasting program, or the additional functions of the programs from the PSIP/PSI decoder 35 to the display (a TV screen) the video stream is displayed thereon. In this instance, the changed description is displayed on a banner window of the display.

The PSI database 37 replaces a prior PMT with the PMT parsed by the PSIP/PSI decoder 35.

Figure 4:
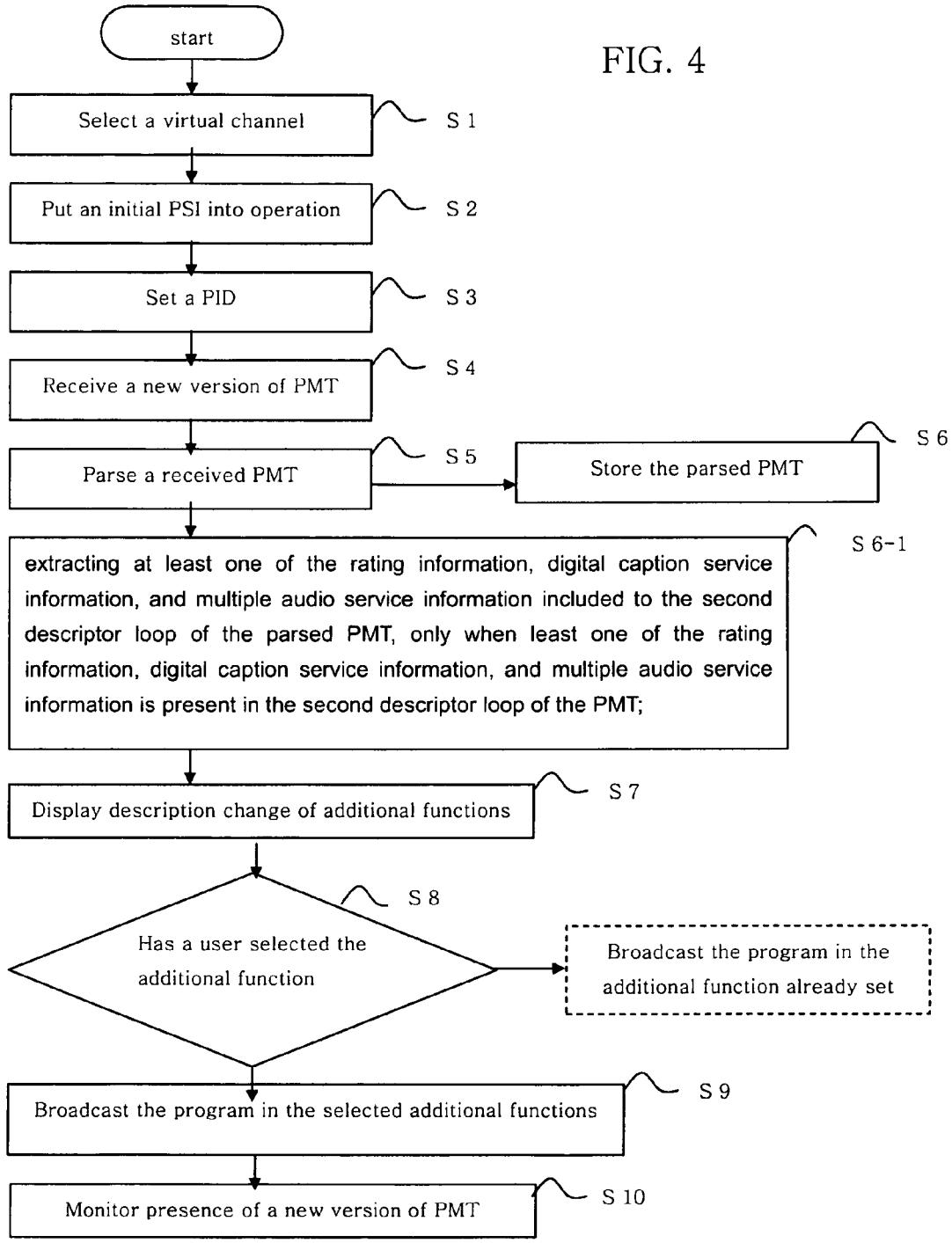
FIG. 4 illustrates a flow chart showing the steps of a method for providing PSI of a digital broadcasting program to a watcher in accordance with a preferred embodiment of the present invention.

A procedure for providing PSI of a digital broadcasting program of the present invention will be explained, with reference to the device for providing PSI in FIG. 3 and FIG. 4. FIG. 4 illustrates a flow chart showing the steps of a method for providing PSI of a digital broadcasting program to a watcher in accordance with a preferred embodiment of the present invention.

As a user selects a particular virtual channel from a transport stream received at the transport stream receiver 31 (S1), the transport decoder 32 receives packet identifiers PID for an audio stream and a video stream of the selected virtual channel, and receives an audio stream and a video stream of the received packet identifiers PID.

In the selection of the virtual channel by the user, as a PMT, a PAT (Program Association Table), and a VCT of a PSIP based on the ATSC are parsed by the PSIP/PSI decoder 35, and broadcasting programs and channel related information are displayed on a banner window of a DTV, the user selects one of virtual channels by means of a selecting device, such as a remote controller. Then, the PSIP/PSI decoder 35 parses a service location descriptor service_location_descriptor of the VCT for the selected virtual channel, so that the transport decoder 32 receives an audio stream and a video stream of the selected virtual channel, selectively. The parsed PAT and PMT are stored in the PSI database 37.

The audio stream received at the transport decoder 32 is decoded at the audio decoder 33, and provided to an audio forwarding device, such as a speaker, and the received video stream is decoded at the video decoder 34, and forwarded to a display (a TV screen).

Under this situation when one of the programs are selected and broadcasted, the PSIP/PSI decoder 35 parses an EIT of the PSIP from a digital broadcasting transport stream, and executes initial additional services (S2). That is, a content advisory descriptor of the EIT is parsed, to execute a parental rating service, and a caption service descriptor of the EIT is parsed, to execute a digital caption service. According to this, the present program is broadcasted by the additional function set for program itself.

During the present program is broadcasted in the initial additional services, the PSIP/PSI decoder 35 has the packet identifier PID, the table ID table_id, the program number program_number, and the version number in the PMT in the transport stream received at the present time for broadcasting stored in the PSI database 37, and filtered to set the packet identifiers PID at the transport decoder 32 (S3).

In this instance, taking an overall system load into account, a register value is set at the transport decoder 32 so as to receive the new version of PMT. Then, an overall load in receiving the DTV transport stream can be reduced. And, a task of the PSIP/PSI decoder 35 in charge of PMT parsing exclusively is pended at a queue for receiving the new version of PMT.

Then, in a case the broadcasting program of the virtual channel the user selected is changed, or the additional functions of the broadcasting program is changed, the PSIP/PSI decoder 35 receives a new version number version_number of PMT through the transport decoder 32 (S4).

In the PSIP/PSI decoder 35 having a PMT parser (not shown) built therein, the PMT parser (not shown) receives the new version of PMT from the transport decoder 32, parses (S5), and updates the PSI database 35 with the parsed PMT (S6). Thereafter, the PSIP/PSI decoder 35 extracts at least one of the rating information, digital caption service information, and multiple audio service information included to the second descriptor loop of the parsed PMT, only when at least one of the rating information, digital caption service information, and multiple audio service information is present in the second descriptor loop of the PMT (S6-1).

In the PSIP/PSI decoder 35 having a PSIP main task block (not shown) built therein, the PSIP main task block (not shown) provides change of the additional functions of the broadcasting program to the user interface block 36 on reception of updating of the PSI database with the new version of PMT.

The user interface block 36 accesses to the newly updated PSI database 37 through the PSIP/PSI decoder 35 and an application interface, and displays the updated description stored in the PSI database 37 on a banner window of a display (a DTV screen) (S7).

According to this, the watcher becomes to know change of the additional functions of the broadcasting program, for the watcher to select a desired additional function.

Thereafter, when the watcher selects a new parental rating, a digital caption service, a multiple audio service by controlling a selecting device, such as a remote controller, while watching the banner window having the additional functions displayed thereon on a display (a TV screen) (S8), the user interface block 36 having the selecting signal received therein informs a description of selection to the PSIP/PSI decoder 35.

Then, the PSIP/PSI decoder 35 broadcasts the program according to the additional function selected by the user. Thereafter, the transport decoder 32 keeps monitoring for presence of a new version of PMT (S10).

If a new version of PMT is sensed in the next transport stream, the PSIP/PSI decoder 35 has a packet identifier PID, a table ID table_id, a program number program_number, a version number version_number from the new version of PMT stored, and filtered, to set a packet identifier PID at the transport decoder 32, again. Steps thereafter is repeated the same as described before.

As has been explained, the device and method for providing PSI of a digital broadcasting program to a watcher of the present invention have the following advantages.

When additional functions (parental rating, digital caption service, and multiple audio service) of a program is changed or added, since the fact of change or addition is reflected to the program, and made to be known in advance, the user can readily select the additional functions the program supports additionally.

Moreover, when PSI of a program is changed, the change is sensed not by parsing descriptors of the EIT and the VCT of the PSIP, but by monitoring a version change of the PMT and receiving only a new version of PMT, an overall system load is reduced.

It will be apparent to those skilled in the art that various modifications and variations can be made in the device and method for providing PSI of a digital broadcasting program to a watcher of the present invention without departing from the spirit or scope of the invention. Thus, it is intended that the present invention cover the modifications and variations of this invention provided they come within the scope of the appended claims and their equivalents.

What is claimed is:

1. A method for providing PSI (Program Specific Information) of a digital broadcasting program, comprising:
    selecting, at a transport decoder, a virtual channel;
    parsing, at a PSIP/PSI decoder, an initial PSI table and setting a packet identifier of a PMT (Program Map Table) in the initial PSI table;
    monitoring, at the PSIP/PSI decoder, a change of a version number in a PMT periodically, the PMT having a first descriptor loop including information describing a broadcasting program and a second descriptor loop including information describing elementary streams (ESs) of the broadcasting program;
    when the version number of the PMT is increased, receiving, at the PSIP/PSI decoder, a new PMT;
    wherein at least one of rating information, digital caption service information, and multiple audio service information is present in the second descriptor loop of the new PMT;
    parsing, at the PSIP/PSI decoder, the new PMT and extracting at least one of the rating information, digital caption service information, and multiple audio service information included in the second descriptor loop of the parsed PMT, only when the at least one of the rating information, digital caption service information, and multiple audio service information is present in the second descriptor loop of the new PMT;
    storing, at a memory, at least one of the rating information, digital caption service information, and multiple audio service information extracted from the second descriptor loop of the PMT; and
    displaying, at a user interface block, a description of at least one of the stored rating information, digital caption service information, and multiple audio service information on a screen according to the broadcasting program corresponding to the PMT,
    wherein the version number in the PMT is increased when at least one of the rating information, digital caption service information, and multiple audio service information in the second descriptor loop of the PMT is changed.

2. A method as claimed in claim 1, further comprising:
    storing, at a PSI database, a packet identifier, a table ID, a program number, and a version number in the PMT; and
    setting a register value at a reception terminal by using the packet identifier for receiving a PMT having a version number greater than a stored version number.

3. A device for providing PSI of a digital broadcasting program comprising:
    a transport decoder for receiving a PMT (Program Map Table) included to a transport stream of a broadcasting program when a virtual channel is selected, the PMT having a first descriptor loop including information describing the broadcasting program and a second descriptor loop including information describing elementary streams (ESs) of the broadcasting program;
    a PSIP/PSI decoder for parsing an initial PSI table, setting a packet identifier of the PMT in the initial PSI table and parsing the PMT and extracting at least one of rating information, digital caption service information and multiple audio service information included to a second descriptor loop of the PMT when a version number the received PMT is changed and only when the at least one of the rating information, digital caption service information and multiple audio service information is present in the second descriptor loop of the PMT;
    a memory for storing at least one of rating information, digital caption service information, and multiple audio service information extracted from the second descriptor loop of the PMT; and
    a user interface block for displaying a description of at least one of the stored rating information, digital caption service information, and multiple audio service information on a screen according to a broadcasting program corresponding to the PMT,
    wherein the version number in the PMT is increased when at least one of the rating information, digital caption service information, and multiple audio service information in the second descriptor loop of the PMT is changed.

4. A device as claimed in claim 3, further comprising a PSI database for storing data of the parsed PMT.

5. A device as claimed in claim 4, wherein the data stored in the PSI database includes a packet identifier, a table ID, a program number, and a version number from the PMT.

* * * * *